March 19, 1935.   E. A. HOBART   1,994,609
ELECTRIC WELDING APPARATUS
Filed Nov. 18, 1931   5 Sheets-Sheet 1

INVENTOR
EDWARD A. HOBART.
BY
ATTORNEY

March 19, 1935.   E. A. HOBART   1,994,609
ELECTRIC WELDING APPARATUS
Filed Nov. 18, 1931   5 Sheets-Sheet 2
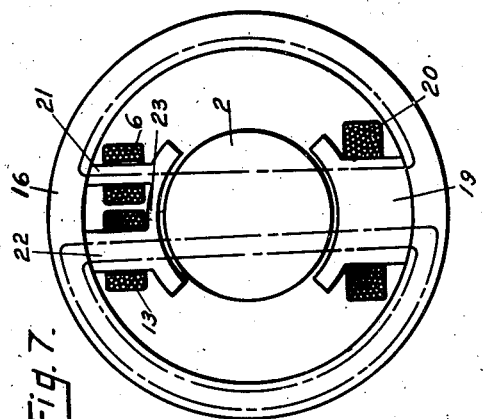
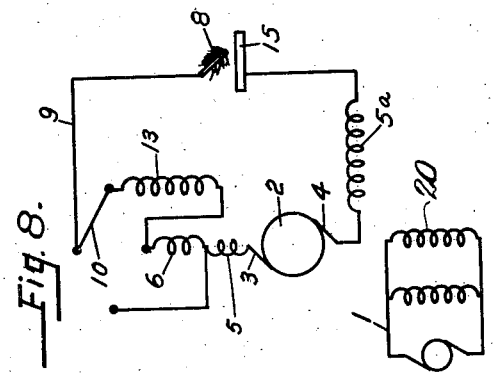
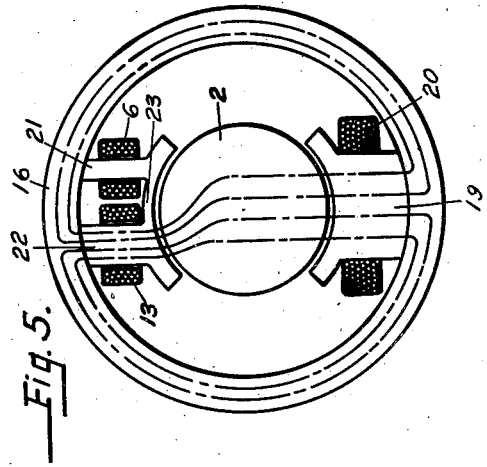
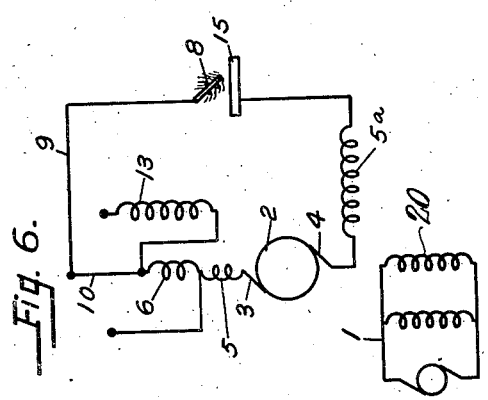
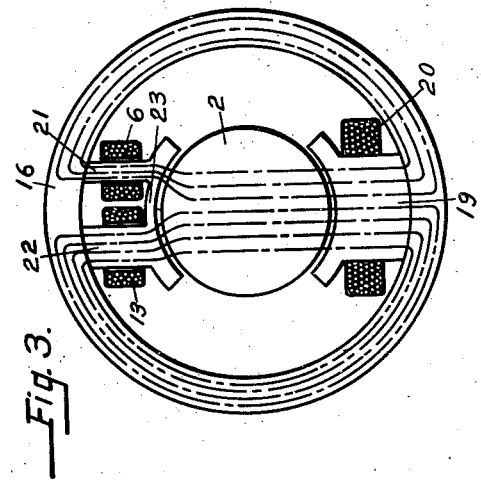
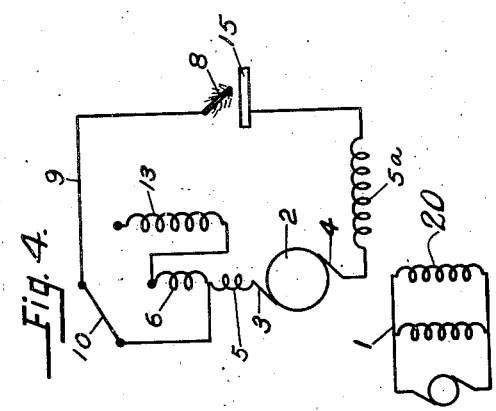
INVENTOR
EDWARD A. HOBART.
BY
ATTORNEY March 19, 1935. E. A. HOBART 1,994,609
ELECTRIC WELDING APPARATUS
Filed Nov. 18, 1931   5 Sheets-Sheet 3
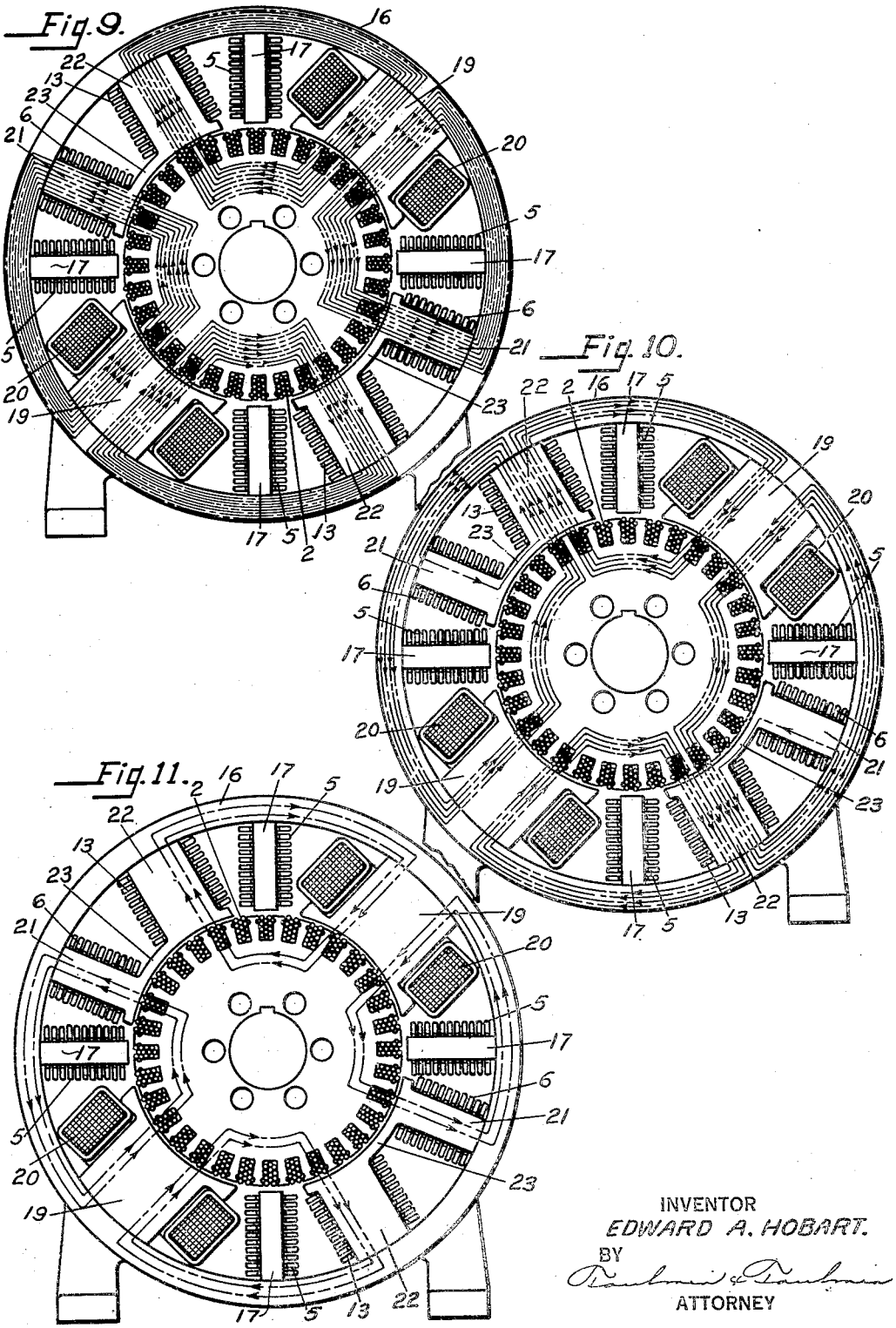
INVENTOR
EDWARD A. HOBART.
BY
ATTORNEY

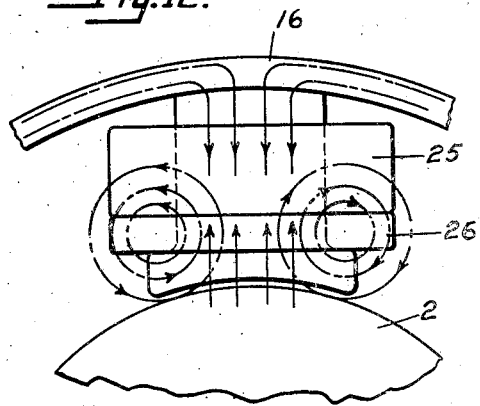
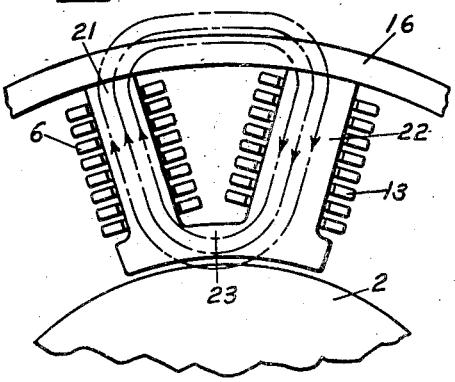
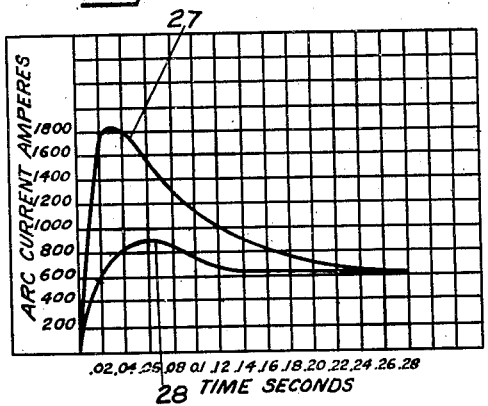
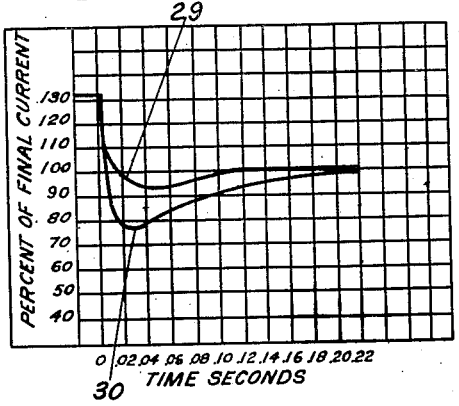

March 19, 1935.  E. A. HOBART  1,994,609
ELECTRIC WELDING APPARATUS
Filed Nov. 18, 1931   5 Sheets-Sheet 5

INVENTOR
EDWARD A. HOBART.
BY
ATTORNEY

UNITED STATES PATENT OFFICE 1,994,609

ELECTRIC WELDING APPARATUS

Edward A. Hobart, Troy, Ohio, assignor to The Hobart Bros. Company, Troy, Ohio, a corporation of Ohio Application November 18, 1931, Serial No. 575,845

18 Claims. (Cl. 171—223)

My invention relates to welding machines.

It is the object of my invention to provide a bifurcated pole welding machine to give a wide current range.

By my invention it is possible to secure various ranges of current adjustments.

It is my object to provide for the handling of a heavier current and for faster welding than has heretofore been possible in the art and to entirely segregate the series windings from the separately excited windings to substantially reduce any transformer effect as a condition arises when any transformer effect occurs such that the lines of force linking in the separately excited field, when the arc current passes through the coils of the series field, cause an inductive kick which is in just the wrong direction from that desired, for when the arc circuit is made, the inductive kick tends to raise the voltage of the separately excited field and so cause a heavier surge on the arc circuit just at the time when it is not desired. It is to be understood, of course, that while there is substantially no transformer action, there is some slight transformer action, and it is very small because the further apart the windings are from one another, the less there will be of the interlocking and interlacing of the lines of force from one coil to the other, and therefore, there will be a corresponding reduction in transformer action. By removing the windings from one another, any slight transformer leakage that may occur is correspondingly reduced.

Furthermore, in the prior art structures so described, when the arc is broken, the two windings oppose each other having a tendency to cause a kick in the opposite direction which reduces the voltage at a time when it should be held up, to prevent the arc from prematurely breaking.

It is the object of my invention, by segregating the series windings on a separate pole from the separately excited field windings, to materially minimize this kick effect.

It is a further object of my invention to provide current control on a welding circuit by segregating the separately excited field and the series windings and associating the series windings with bifurcated poles of varying capacities, which are adapted to carry the flux from the separately excited fields and to thereby vary the current.

It is my object to provide means of placing in circuit the series windings associated with the respective bifurcated poles so that the series windings will control the flux flowing through the pole due to the separately excited field windings either forcing this flux through the other half of the pole, which is a comparatively restricted section, and in this way reducing the amount of total flux, or by suppressing from both bifurcated poles by means of both the series windings, thus reducing the flux to the minimum and thereby reducing the current to the minimum.

Referring to the drawings:

Figure 3 is a diagrammatic view of the bifurcated pole welding machine used as a separately excited machine with both bifurcated pole paths open having the maximum voltage range;

Figure 4 is a diagram indicating the winding therefor and the arrangement of the circuit;

Figure 5 is a view similar to Figure 3 showing the small flux path of the bifurcated pole practically cut out giving a medium current range;

Figure 6 is a wiring diagram for Figure 5;

Figure 7 is a view similar to Figure 5 showing both bifurcated poles flux paths substantially cut out giving a low range on the machine;

Figure 8 is a wiring diagram for Figure 7;

Figure 9 is a section through a four-pole welding machine showing the lines of flux when the welding machine is open to the highest range;

Figure 10 is a similar view showing the lines of flux at the medium range;

Figure 11 is a similar view showing the lines of flux at the low range;

Figure 12 illustrates the prior art arrangement in which the bucking series field produces lines of force opposing the shunt field and its inductive effect producing an instantaneous voltage in the wrong direction when making or breaking the arc;

Figure 13 is a diagram indicating the arc current amperes, the welding current bucking series field curve and the welding current bifurcated pole winding curve in terms of time seconds showing the extent of reduction of the welding current with the bifurcated pole winding as compared with the prior art winding in Figure 12 upon the making of the arc;

Figure 14 is a comparative diagram to Figure 12 showing the arrangement of my invention;

Figure 15 is a similar graph to Figure 13 showing the curves of the prior art and of my invention upon the breaking of the arc;

Figure 1:
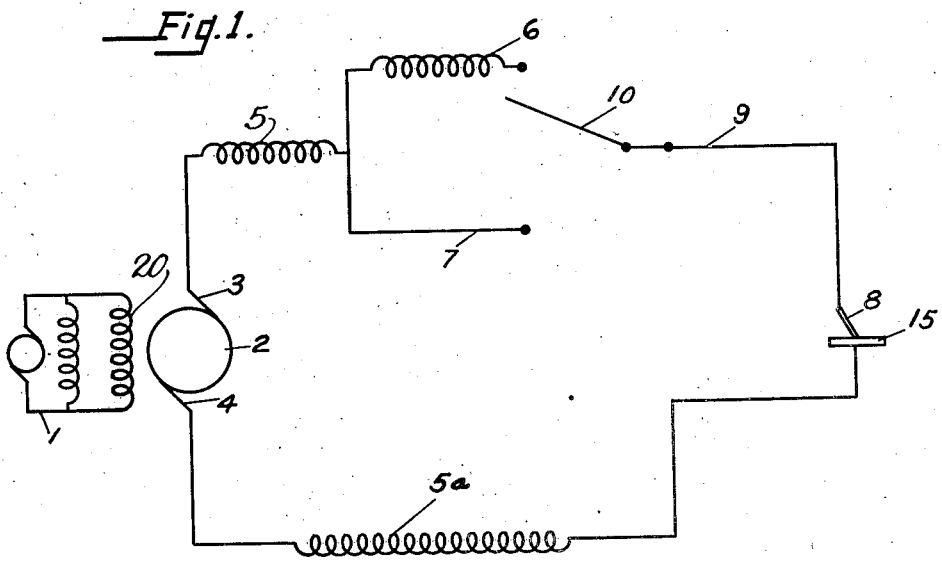
Figure 1 is a diagram of a separately excited machine having a two-stage current control, one utilizing a machine as a separately excited machine and the other using a machine with a small bifurcated pole winding.

Referring to the drawings in detail, 1 refers to the exciter and 2 to the armature of the machine having the brushes 3 and 4. 5 refers to the inter-pole winding and 5a to the reactance winding.

In the arrangement of Figure 1 I provide small bifurcated pole winding 6 in parallel with the line 7 so that the electrode 8 can be connected by the line 9 and switch 10 alternately to the line 7, or to the small bifurcated pole winding 6 for a reduction in voltage.

Figure 2:
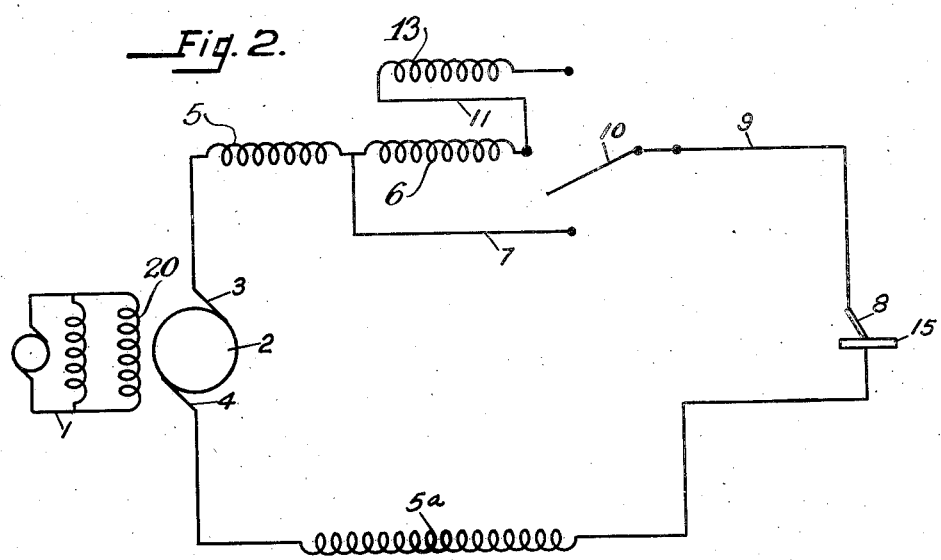
Figure 2 is a diagram showing a three-stage machine taking a separately excited field or a succession of bifurcated pole windings arranged one after the other in the circuit.

In Figure 2 I provide, in addition to the small bifurcated pole winding 6, a connection 11 which places the small bifurcated pole winding in series with the larger bifurcated pole winding 13. In either event the switch member 10 can provide a shunt circuit through the line 7 for the maximum current flow or the switch member 10 may be connected into the large bifurcated pole winding 13 for the minimum current flow or to the bifurcated pole winding 6 for the intermediate current flow. The part marked 15 is the part being welded.

The physical construction of the machine comprises the frame 16 on which are mounted the inter-poles 17 having the inter-pole windings 5 between which are mounted the pole pieces 19 having the separately excited windings 20.

I further provide a bifurcated pole customarily formed of two legs 21 and 22 joined by a narrow bridge 23 having the respective small bifurcated pole winding 6 and large bifurcated pole winding 13. The advantage of a dual pole over a single pole is that a greater reactance effect to produce a steadier arc results from the dual pole than from the single pole, particularly when one of the windings is in operation on one of the legs of the dual pole. The reactance acts as a reservoir of electrical energy to supply a sufficient surplus to the line to insure uniform welding current and to avoid the fluctuations that are undesirable if it were not for the reactance. By having a bifurcated pole, an electrical mass is provided so that there are continuous lines of force distributed throughout the bifurcated pole and the yoke or frame ring upon which the pole is mounted. This provides a reactance area or path for the storage of electrical energy, which would not be true if there were a single pole because there would be no circulatory path for these lines of flux with a single pole.

Figure 16:
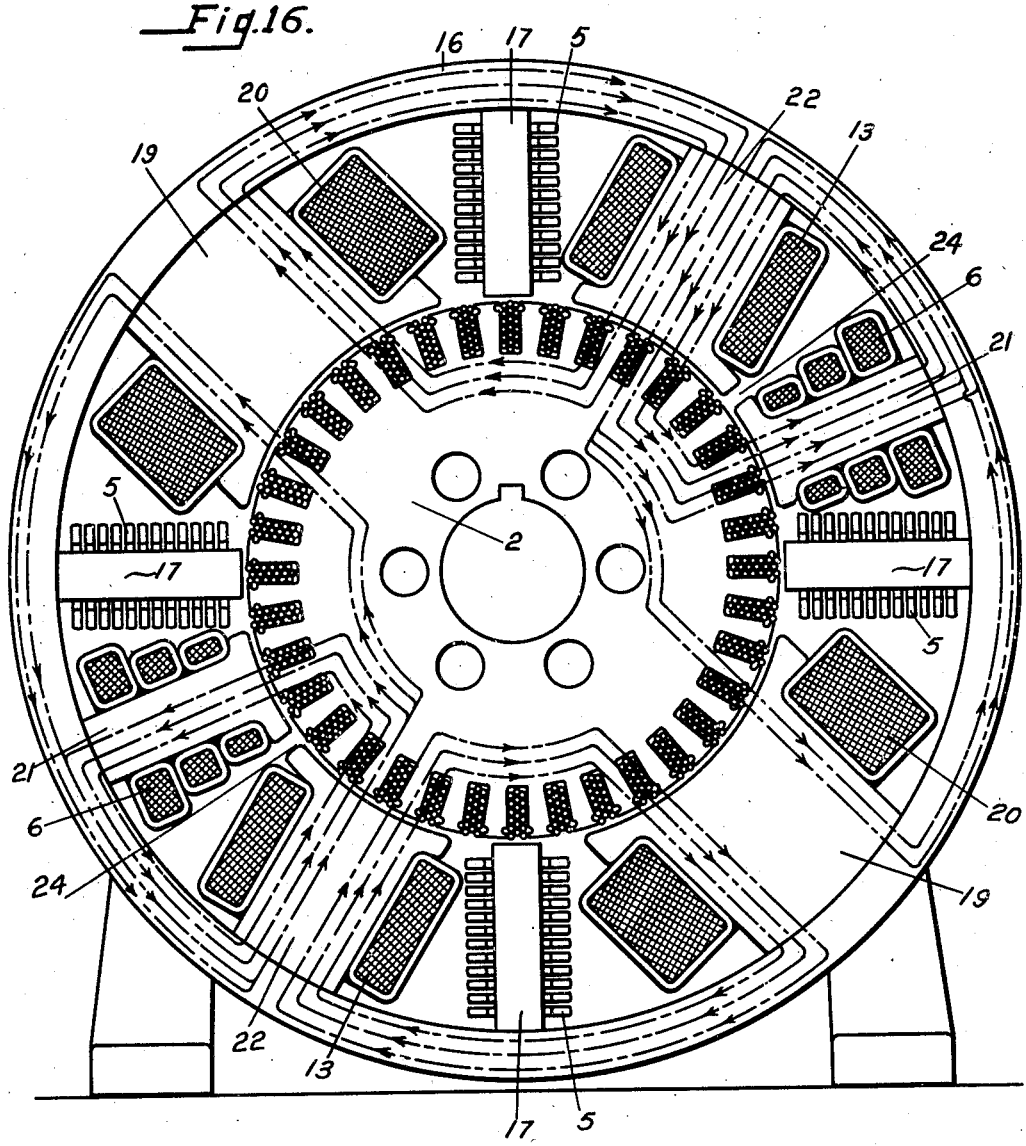
Fig. 16 is a section through the stator and rotor of the apparatus showing the bifurcated poles with the bridge between them separated to form a small air gap.

As will be seen in Figure 16, these bifurcated poles may be separated from one another and separated by a narrow air gap 24.

Referring to the feature of the invention relative to the reduction of the surge in the line upon the making and breaking of the arc, which has heretofore been a very undesirable characteristic of prior art machines, upon an inspection of the prior art structure in Figure 12 and the structure of my invention in Figure 14, the difference will be seen in the means by which I accomplish the improved result in reducing this kick or inductive surge.

In Figure 12 it will be noted that the bucking series field produces lines of force opposing the shunt field 25 and its inductive effect produces an instantaneous voltage in the wrong direction when making or breaking the arc. In this view, 26 indicates the series field.

In Figure 13 it will be noted that the upper curve 27 is the welding current bucking series field curve of the prior art machine upon the making of the arc. The heavy surge at the beginning of the application of the arc is clearly indicated, whereas the curve 28 indicates the correction very materially of this condition by my invention.

Referring to Fig. 14, the lines of force indicated by the arrows thereon show the flux lines that indicate the nature of the reactance and the accumulation of a pool of electrical energy in order to provide a reservoir of electrical energy supply to maintain a uniform welding current.

Likewise, in Figure 15, the curve 29 shows the welding current in the bifurcated pole winding, while the curve 30 shows the welding curve in the bucking series field winding, whereas there is a considerable surge or kick at the instant of breaking the arc at the very time when it is not desired.

I place the shunt field windings and bifurcated pole windings on separate poles to avoid the transformer action between the series field on the bifurcated pole and the shunt fields.

I find by a variation of the size and effect of the series winding and pole in opposing the flux of the shunt field and pole, I can control the amount of current utilized in welding.

The inter-pole and its winding is used to provide a neutral point for the brushes in order to get good commutation. The reactance coil is employed to steady the arc.

Therefore, it will be observed that there are two main objects of this invention. The first object is to obtain a welding machine with a very wide current range as high as from 60 to 600 amperes on a size welding machine with a 400 ampere rating. This means that the operator can weld anything from the light gauge sheet metal up to heavy plate; and means that the current is adjustable to this welding range to take care of the various thicknesses of metal. This wide welding range is accomplished, not by the usual method of tapping off at various places on the bucking series winding or arranging a variable shunt around this winding, but it is obtained by varying the size of the flux paths through which the main armature flux may pass, by cutting out the flux first on one side and then on the other of our diverter pole piece.

The second purpose of the invention is to provide a machine which eliminates current surging, produced in starting the arc, and thereby maintaining a constant arc, both in the making and in the breaking thereof. The practical meaning of the elimination of these current surges is that it is easier to start the arc, there is practically no sticking of electrodes, and it means that, while welding, and when globules of metal pass from the electrodes to the work causing a short circuit, there is no excessive flow of current, which can explode these globules of metal to cause sputtering and spattering, which is thus eliminated. It further means that, if the arc has a tendency to break, the elimination of the surge in the current in this direction tends to make it hang on. In the ordinary bucking compound machine, the close proximity of the series winding to the shunt winding is one of the main reasons for these surges.

By placing the separately excited field winding on one pole and the series winding on the opposite pole away from it, these surges are practically eliminated.

It will be understood that I desire to comprehend within my invention such modifications as may be necessary to adapt it to the varying conditions and uses.

Having thus fully described my invention, what I claim as new and desire to secure by Letters Patent, is:

1. In a welding machine, a separately excited winding, a pole structure associated therewith, a bifurcated pole, and a bifurcated pole winding associated therewith, and means of opposing said separately excited and bifurcated pole windings for varying the voltage delivered, said bifurcated pole comprising separable portions having separable windings.

2. In a welding machine, a separately excited winding, a pole structure associated therewith, a bifurcated pole, and a bifurcated pole winding associated therewith, and means magnetically related to said separately excited and bifurcated pole windings for varying the current delivered, said bifurcated pole comprising separable portions having separable windings of different size.

3. In a welding machine, a separately excited winding, a pole structure associated therewith, a bifurcated pole, and a bifurcated pole winding associated therewith, and means of opposing said separately excited and bifurcated pole windings for varying the current delivered, said bifurcated pole comprising separable portions having separable windings of different size, and means of selectively connecting said pole windings.

4. In a welding machine, a plurality of separately excited windings and poles associated therewith, a plurality of bifurcated pole windings and bifurcated poles associated therewith, and means of placing said bifurcated pole windings in opposition to the separately excited windings.

5. In a welding machine, a plurality of separately excited windings and poles associated therewith, a plurality of bifurcated pole windings and bifurcated poles associated therewith, and means of placing one or all of said bifurcated pole windings in magnetic relation with the separately excited windings.

6. In a welding machine an armature, poles and separately excited windings associated with said poles, means of carrying the flux from the poles through the armature and back to the poles, series field windings associated with said flux carrying means adapted to oppose said separately excited windings to control the amount of flux carried by the flux carrying means and the poles through the armature, and means for cutting in and out the series field windings to adjust the extent to which said series field windings oppose said separately excited windings to so regulate the flux flow, said series field windings being associated with separable portions of said flux carrying means, said windings and flux carrying means being of different sizes whereby the flux flowing can be controlled according to the number of flux carrying means and flux carrying means windings opposed to one another.

7. In combination, a welding machine frame, spaced poles mounted thereon, separately excited windings thereon, bifurcated poles mounted on said frame comprising a large leg and a small leg, and means interconnecting said legs adjacent an armature of the machine, an armature, interpoles mounted on said frame having interpole windings, and means of opposing the bifurcated pole windings with respect to the separately excited field windings.

8. In a welding machine, the combination of a generator having an armature, commutator poles, separately excited windings for the generator, bifurcated poles, and windings on the commutator poles and the bifurcated poles, a circuit for the generator including the commutator windings, means to connect the bifurcated pole windings into the circuit, and a reactance in said circuit.

9. In a welding machine, the combination of an armature, field poles having separately excited windings thereon, bifurcated poles with windings thereon, a circuit connected to said machine in which said bifurcated pole windings may be interposed, a reactance in said circuit, an interpole and interpole winding in said circuit and means to cut the bifurcated pole windings into the circuit.

10. In a welding machine, spaced main field poles, separately excited field windings associated therewith, bifurcated poles spaced therefrom, series windings thereon, interpoles and interpole windings between said bifurcated field poles and main poles, a circuit interconnecting said windings, means of varying the extent to which the series windings are interposed in said circuit.

11. In a welding machine, spaced main poles, separately excited windings on said poles, bifurcated poles spaced from said main poles, windings on said bifurcated poles, interpoles and interpole windings between said bifurcated poles and main poles, a circuit including said interpole windings, means to cut into said circuit one or more of said bifurcated pole windings, and a reactance coil in said circuit.

12. In a generator, an armature, commutation poles excited by coils connected in series with the armature, poles excited by coils connected to a separate exciter, and bifurcated poles, one bifurcated pole between each commutation pole and a separately excited pole, each bifurcated pole being excited by a coil adapted to be placed in series with a commutation coil.

13. In a generator, an armature, commutation poles excited by coils connected in series with the armature, poles excited by coils connected to a separate exciter, bifurcated poles, said bifurcated poles being arranged in pairs, each pair between a commutation pole and a separately excited pole, each bifurcated pole being excited by a coil, and means to connect one coil of each pair of poles or both coils of each pair of coils in series with a commutation coil.

14. In a generator, an armature, commutation poles excited by coils connected in series with the armature, poles excited by coils connected to a separate exciter, bifurcated poles, said bifurcated poles being arranged in pairs, the poles of each pair being connected by a bridge and located between a commutation pole and a separately excited pole, each bifurcated pole being excited by a coil, and means to connect one coil of each pair of poles or both coils of each pair of poles in series with a commutation coil.

15. In a welding machine, the combination of a field winding and its pole, means for exciting said winding, a bifurcated pole piece, an opposing series winding mounted on each of the legs of said bifurcated pole piece, means for successively placing in operation one of the series windings in one of the legs of the pole piece, whereby the flux will be successively prevented from passing through first one path in one leg of the bifurcated pole and then through another path in another leg of the bifurcated pole thus successively limiting the total flux path and varying the current output of the welding machine.

16. In a welding generator, the combination of a separately excited field winding and its pole, means for exciting said winding, opposing series field windings, a bifurcated pole having the respective windings mounted on the respective legs thereof, means for successively connecting said series fields in circuit to place one or more of them in circuit in opposition to the series field winding, whereby the transformer effect between the separately excited and series windings will be minimized so that current surges while welding are reduced.

17. In a welding machine, a bifurcated pole piece, series windings mounted on said respective pole pieces, means for placing one or more of said windings in circuit successively, an oppositely disposed shunt pole piece of opposite polarity to the bifurcated pole piece, a separately excited winding thereon, and means for exciting said separately excited winding whereby as the series windings are placed in circuit the flux will be prevented from going through that part of the bifurcated pole piece supporting the series winding in circuit thus limiting the total flux path and varying the current output of the welding machine.

18. In a welding machine comprising a frame, poles mounted thereon, separately excited windings mounted on said poles, bifurcated poles mounted thereon comprising spaced interconnected legs, bifurcated pole windings mounted on said respective legs, interpoles interposed between said first mentioned poles and the bifurcated poles, and interpole windings mounted thereon, means to place said bifurcated pole windings in magnetic relation with the separately excited windings, and means whereby the bifurcated pole windings can be successively cut in or out in increasing or decreasing amount opposed to the separately excited windings to control the amount of current applied on the line.

EDWARD A. HOBART.